United States Patent [19]

Buttigieg

[11] 4,224,167
[45] Sep. 23, 1980

[54] FILLER TUBE AND FILTER ATTACHMENT UNIT FOR FUEL

[76] Inventor: Philip Buttigieg, 1612 York Ave., New York, N.Y. 10028

[21] Appl. No.: 22,088

[22] Filed: Mar. 19, 1979

[51] Int. Cl.² .............................................. B01D 29/10
[52] U.S. Cl. .................................. 210/460; 137/592; 220/86 R; 220/DIG. 33; 296/1 C
[58] Field of Search ................. 285/226, 138, DIG. 2; 137/592; 220/86 R, 371, DIG. 33; 280/5 A; 296/1 C; 210/435, 436, 445, 446, 451, 455, 459, 460

[56] References Cited

U.S. PATENT DOCUMENTS 2,379,735  7/1945  Meikle .............................. 220/86 R Primary Examiner—Frank Sever
Attorney, Agent, or Firm—Alexander Mencher

[57] ABSTRACT

A filler tube or hose and filter unit for disengageable attachment to and disposition within a filler pipe and within a communicating storage tank, and having as one component a flexible and reinforced hose, as a second component mounting or disengageable attaching means at the upper end of the hose for cooperation with the filler pipe mouth and for receipt of a closure cap, and as a third component filtering means at the lower end of the hose whereby said hose serves as the conduit for a smooth flow of fuel from the source or pump to the storage tank, and the filtering means serves both to eliminate impurities in the fuel and to aid in preventing sudden backsurge of the fuel from the tank in the event of accidental impact.

6 Claims, 6 Drawing Figures

U.S. Patent     Sep. 23, 1980     4,224,167
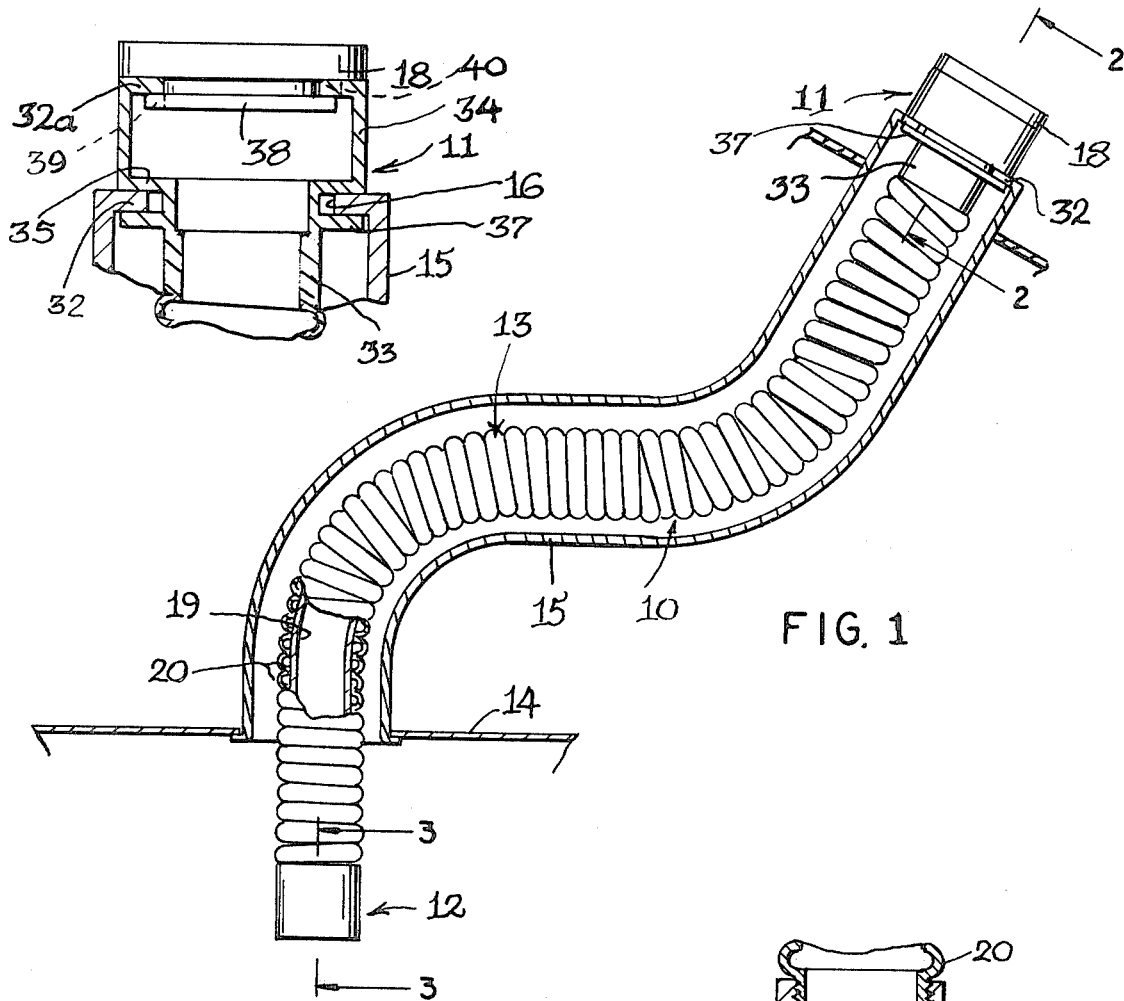
FIG. 2
FIG. 1
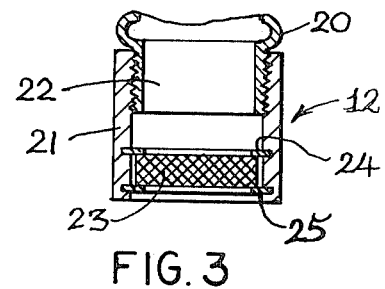
FIG. 3
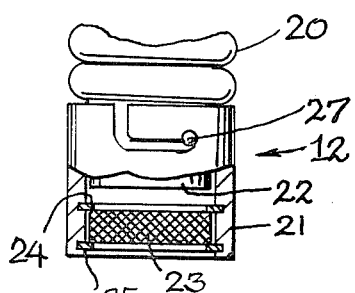
FIG. 3A
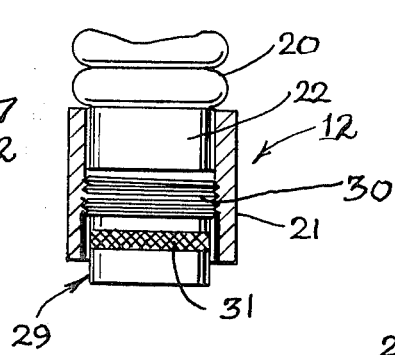
FIG. 3B
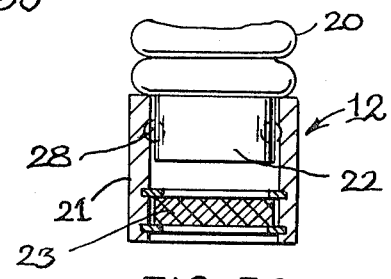
FIG. 3C

FILLER TUBE AND FILTER ATTACHMENT UNIT FOR FUEL

BACKGROUND OF THE INVENTION

The invention relates generally to filler pipes leading to storage tanks or receptacles and to filtering devices for liquid fuels as gasoline for vehicular-carried internal combustion engines, or stationary engines and other types of equipment.

It is known that filler pipes can malfunction from normal use, defects and attrition; and also rupture on accidental impact leading to possible fire and explosion. It is further known that filtering out impurities or foreign matter in gasoline protects the carburetor, fuel lines and fuel pump. According to the invention and as a further function of the filtering means herein is the ability of the filter structure to help prevent sudden back-surge of the fuel from the tank and possible spill in the event of accidental impact.

Heretofore, filters have been used either at the pumping stations or in the filler pipes or tanks of automobiles, but according to inventor's present knowledge of the art, there has been no easily replaceable attachment unit capable of serving as a shatter-proof filler tube as a fuel conduit and as a fuel-filtering device also serving as a barrier against sudden back-surge of fuel from the storage tank.

SUMMARY OF THE INVENTION

Accordingly, it is an important object of the invention to provide a simple, compact and efficient attachment comprised of a filler hose and filter attachment unit which can be easily mounted and replaced in the filler pipe and gas tank of a vehicle.

A further object of the invention is to provide a unit which can be easily installed in and removed and replaced from the filler pipe and tank of a vehicle, which consists of relatively few components and which is constructed and adapted to be mounted on and to depend from the mouth of the filler pipe. The hose serves as a smooth and non-angular fuel conduit and the filter in its filtering function as well as a barrier against fuel back-surge as stated.

Another object of the invention is to provide a supplemental fuel pipe which is substantially shatter-proof and which converts the normal fuel pipe as an auxiliary element.

A further object of the invention is to provide a simple and inexpensive attachment unit which is especially applicable to the fuel filler pipe and the storage tank of a motor vehicle but which can also be used in association with the filling of other tanks, such as storage tanks for gasoline and the like liquids, or with stationary engines and equipment of different types.

These objects and other incidental ends and advantages of the invention will hereinafter be described and claimed in conjunction with the accompanying drawings forming a part hereof and wherein like reference numerals refer to like parts throughout.

BRIEF DESCRIPTION OF DRAWINGS

In the drawings,

FIG. 1 is a fragmentary sectional view partly in elevation of a filler pipe and communicating storage tank showing the filler tube or hose and filter attachment unit mounted and operative therein;

FIG. 2 is an enlarged sectional view of FIG. 1 across the plane 2—2 thereof;

FIG. 3 is an enlarged sectional view of FIG. 1 across the plane 3—3 thereof; and FIGS. 3A, 3B and 3C are each enlarged sectional views of modified forms of the filter component shown in FIG. 3.

DESCRIPTION OF EMBODIMENTS OF INVENTION

In accordance with the invention and the preferred forms shown in the drawings, the filler tube or hose and filter unit or attachment and generally designated by numeral 10 is comprised of three components, namely, a mounting adapter generally designated by numeral 11 and serving as the attaching means for the unit, a filter generally designated by numeral 12 and an intermediate and elongated flexible tube or hose generally designated by numeral 13, said hose being adapted to serve as the effective filler pipe of the storage tank 14.

Mounting adapter 11 as shown in preferably integral with the upper end of hose 13 and is sized and structured to engage and disengage any type of conventional filler pipe mouth 16 at the upper end of any conventional filler pipe 15 of a motor vehicle (latter not shown), while the filter body 12 integrally or detachably secured to the lower end of hose 13 is adapted to lie within the conventional tank 14 of a motor vehicle. As best shown in FIG. 1, filler pipe 15 extends from the upper end which is accessible externally of the body of the motor vehicle while the conventional cap or closure (not shown) is substituted by the adapter having its own closure cap 18. Adapter 11 is suitably and disengageably attachable to the upper end of hose 13 as will appear hereinafter.

Hose 13, which is reinforced and flexible about the axis thereof against linear angular compression, which may be possible when filler pipe 15 has bends, is adapted to maintain substantially constant circular cross-section so as not to interfere with smooth flow of the fuel into storage tank 14. Hose 13, moreover, is formed or molded of a material inert physically and chemically to the liquid fuel used and may be of any suitable shatter-proof plastic such as Nylon or other synthetic composition.

Hose 13 as shown in one form has a smooth inner face 19 and external corrugations, or rings, or helical winding elements 20. It is of course understood that other types of hose structures may be utilized to embrace the characteristics described. Further, diameters of hose 13 and lengths thereof may vary depending upon the bends, shape, length and diameters of the filler pipe 15 as the latter is conventionally used and constructed.

Filter 12 secured to the lower end of hose 13 is substantially of the same outside diameter of hose 13 and when in rigid form is comprised of a short fitting so as not to interfere with the insertion of hose 13 into filler pipe 15 and with the flexibility function of the hose. Inside diameter of filler pipe 15 and outside diameter of hose 13 are adapted to vary in order to both make insertion of hose 13 therein and at the same time not allow too much clearance so as to vitiate the fuel back-surge barrier function of the filter as will appear.

Filter 12 as shown in FIG. 3 is comprised of a housing 21 suitably secured to a hose projection at the lower hose end and as indicated by numeral 22, and has mounted therewithin and across the axis thereof a suitable filter such as a disc 23 made of any suitable filtering or cellulosic material. Disc 23 is removably and also replaceably insertable within a pair of spaced retaining rings 24 and 25 mounted within the housing 21 while engagement between hose projection 22 and the filter housing 21 is by threaded connection 26.

Other filter housings and connections with the lower end of hose 13 are shown in FIGS. 3A, 3B and 3C. In FIG. 3A, lower hose end projection 22 is disengageably connected to filter housing 21 by the conventional slot and bayonet assembly indicated generally by numeral 27, while in FIG. 3C the connection is made by the conventional spring-ball retainer assembly generally indicated by numeral 28. A further connection type is shown in FIG. 3B wherein filter housing 21 is affixed to lower hose end projection 22, said housing having an internal thread for removable engagement with a filter fitting generally indicated by numeral 29. Fitting 29 has an external thread 30 for engagement with said housing internal thread at one end thereof and at the other end is provided with an internally disposed filter element 31.

It is to be observed that adapter 11 forms the outer upper end of hose 13 and is of any required suitable construction adapted for safe and efficient lockable engagement with the filler pipe mouth flange, such engagement serving as the mounting for attachment or unit 10 after insertion in filler pipe 15 and tank 14 for operation and replacement. Thus adapter 11 as shown has a lower and axially communicating section with an upper end hose projection, an upper section of enlarged diameter if desired for any purpose and as shown and axially communicating with the lower section and an intermediate section functioning to lockably mount the unit or attachment 10 to the flange 32 at the upper end of filler pipe 15.

More specifically, hose 13 at the upper end is provided with an axially projecting extension as hereinbefore stated and which is adapted to be secured to or formed integral with the lower communicating adapter section, said extension and lower section being indicated by the common reference numeral 33. An upper section axially aligned with lower section 33 and indicated by numeral 34 is shown as of larger diameter to function as the adapter fluid conduit section, the inwardly turned upper edge forming flange 32a to which a closure cap 18 is adapted to be lockably and disengagably secured as will appear hereinafter.

Adapter sections 33 and 34 are integrated or connected by intermediate shoulder 35 which is adapted to sit on and lockably engage with the inwardly turned flange 32 at the upper end of filler pipe 15, said flange and shoulder cooperation also serving to limit downward movement of attachment unit 10 when inserted into filler pipe 15 and tank 14. Any suitable lockable engagement to prevent movement and upward vertical displacement of the unit 10 after insertion into filler pipe 15 and tank 14 is accomplished as by providing flange 32 with an appropriate notch for penetration by a radially disposed and registering skirt 37 on adapter lower section 33, the latter being disposed below shoulder 35. A twisting operation in one direction thus clamps adapter 11 to flange 32 for affixation of the unit 10 while twisting in the opposite direction brings skirt 37 into registration with the last-mentioned notch (not shown) in filler pipe flange 32 as for unit 10's withdrawal and reintroduction thereof or introduction of replaced units.

Flange 32a of the adapter upper section 34 serves as heretofore mentioned as a seat for and lockable engaging means for adapter closure cap 18, said cap having suitable locking means cooperating with said flange effective as by twisting movement. Thus, cap 18 has the depending clamping plate 38 with cutout 39 and flange 32a has a cooperating cutout 40 whereby when cap 18 is twisted in one direction, the cap becomes removable and when twisted in the opposite direction, the cap becomes clamped and locked.

It is distinctly understand that minor changes and modifications in the combination, size, material, integration and position of parts may all be resorted to without departing from the spirit of the invention and the scope of the appended claims.

I claim:

1. A filler tube and filter unit for attachment to a filler pipe and liquid-fuel storage tank in communication therewith and adapted for vehicular engine and other equipment use, comprising as one component an imperforate flexible hose of a shatter-proof material of construction adapted to be insertable within and concentrically disposed along said filler pipe and terminating within said liquid-fuel storage tank, said flexible hose along the length thereof having continuous and smooth-surfaced inner walls and said filler pipe serving as a protective housing for said flexible hose, a second component comprising attaching means with a closure cap therefor and secured to and communicating with the upper end of the said hose for engagement with the mouth of the filler pipe whereby said hose serves as the sole conduit for flow of fuel from the source or pump to the fuel tank, and filtering means as a third component for the fuel and being secured to and communicating with the lower end of the said hose; said filtering means being of a predetermined permeability sufficient to prevent sudden back-surge of fuel from said fuel tank.

2. A filler tube and filter unit as set forth in claim 1 wherein said flexible hose is formed of plastic material inert to said fuel, circular in cross-section and having spaced and integral reinforcing rings in parallel relationship along the length thereof for easy insertion into the filler pipe, for conformation to filler pipe bends along the length thereof and for maintenance of circular cross-section along the length thereof.

3. A filler tube and filter unit as set forth in claim 2 wherein said attaching means is integral with the upper end of the flexible hose and includes elements for disengagable connection with the filler pipe mouth.

4. A filler tube and filter unit as set forth in claim 3 wherein said filtering means comprises a housing disengagably secured to the lower end of the hose and a filter element secured within and across said housing.

5. A filler tube and filter unit for attachment to the mouth of a filler pipe and concentrically disposed therein and extending into the liquid-fuel storage tank in communication with said filler pipe and adapted for vehicular engine and other equipment use, comprising as one component an imperforate flexible hose of a shatterproof material of construction having means at the upper end for detachable engagement with the mouth of the filler pipe and further means for detachable engagement with a closure cap, said flexible hose along the length thereof having continuous and smooth-surfaced inner walls and said filler pipe serving as a protective shell for said flexible hose, a filter assembly as the second component comprising a housing disengagably secured to the lower end of the said hose and in communication therewith, said housing having mounted within and thereacross a filter element of predetermined permeability sufficient to prevent sudden back-surge of liquid-fuel from said storge tank.

6. A filler tube and filter unit as set forth in claim 5 wherein said hose is formed of plastic material inert to said fuel, circular in cross-section and having spaced and integral reinforcing rings in parallel relationship along the length thereof for easy insertion into the filler pipe, for conformation to filler pipe bends along the length thereof and for maintenance of circular cross-section along the length thereof.

* * * * *